May 12, 1964 J. W. TONE ETAL 3,132,851
MASHING AND WHIPPING IMPLEMENT
Filed Nov. 23, 1962
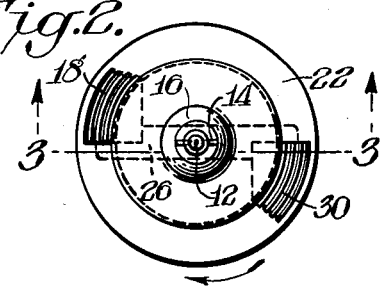
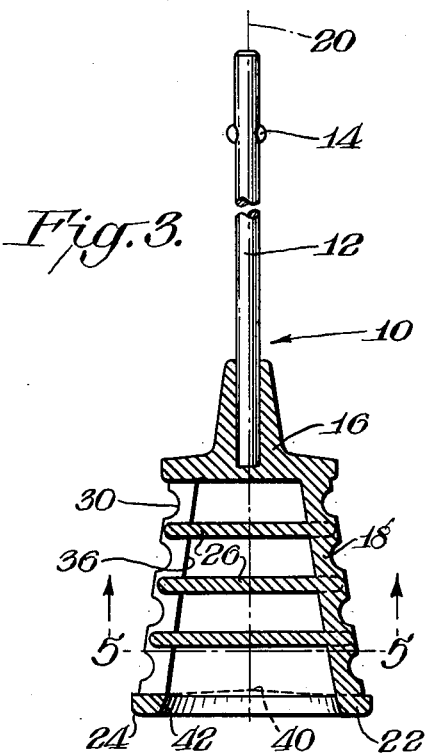
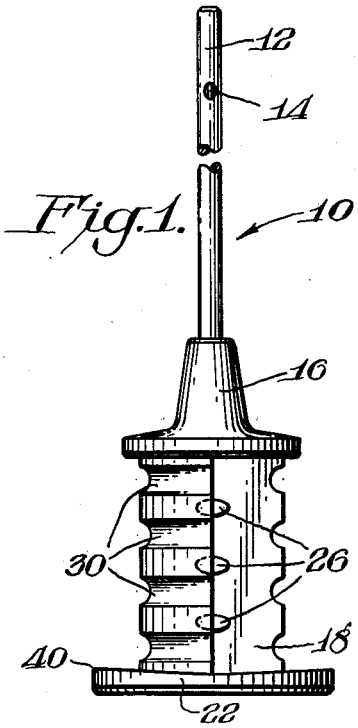
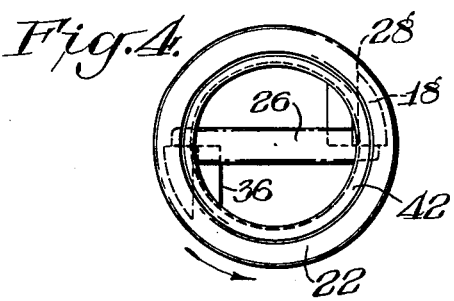
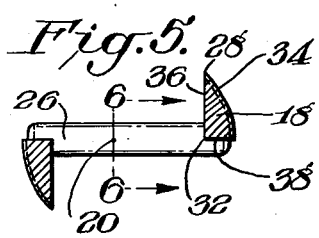
INVENTORS
John W. Tone
William D. Taylor
BY Connolly and Hutz
ATTORNEYS

United States Patent Office 3,132,851
Patented May 12, 1964

3,132,851
MASHING AND WHIPPING IMPLEMENT
John W. Tone and William D. Taylor, Wilmington, Del., assignors to Ronson Corporation, Woodbridge, N.J., a corporation of New Jersey
Filed Nov. 23, 1962, Ser. No. 239,662
10 Claims. (Cl. 259—134)

This invention relates to a rotatable mashing and whipping implement primarily intended for use as an attachment with a motorized domestic appliance, and it more particularly relates to such an implement for use with a portable type of such an appliance.

Various electric motor-driven kitchen appliances now in use have output sockets for rotating various attachments or implements such as drink mixers, knife sharpeners, whippers and the like. One of such appliances, as described in copending commonly assigned U.S. patent application S.N. 181,383, filed March 21, 1962, is for example basically intended for use as a portable can opener; and it also incorporates a rather low power output coupling at its front end for receiving various rotational implements. This output coupling rotates, for example, at a speed of from approximately 2,000 to 2,200 r.p.m., and implements rotating at these speeds are available for mixing and whipping liquids. However there is a need for an efficient low-powered rotational implement for mashing and whipping soft solids in addition to mixing and whipping liquids.

An object of this invention is to provide a rotatable mashing and whipping implement which is capable of breaking up, mashing and whipping soft foods, such as cooked potatoes and apples as well as mixing and whipping liquids.

Another object its to provide such an implement which is advantageous for use with a portable low-powered source of rotation.

In accordance with this invention a rotational implement includes a head attached to a stem for coupling it to a source of rotation. Longitudinal blades spaced about the implement's axis of rotation extend from the side of the head opposite the stem. A ring having an outer periphery extending outside that of the blades connects the ends of the blades remote from the head. The leading edges of the blade in one direction of rotation converge to a sharp edge, and these leading edges are disposed farther away from the axis of rotation than the inner portions of the trailing edges of the blades to cause particles struck by the blades to substantially remain in the path of movement of the rotating blades.

The bottom ring is used to break up large pieces of soft food, such as boiled potatoes and boiled apples, and it also protects the blades from striking the sides of the bowl. The sharp leading edges of the blade thoroughly chop the food into minute particles. Then they completely and efficiently whip the mixture into a fluffy mass. The active length of the active leading edges of the blades is increased by peripherally grooving and accordingly scalloping them. An outward tapering of the blades helps prevent spattering as the implement is drawn out of a mixture and helps facilitate the entry of the larger pieces within the inside of the ring as it is forced down upon them. Bars extending across the blades stiffen the implement and prevent fingers from being trapped between them. A particularly advantageous implement of this type incorporates a pair of blades equidistantly spaced across the axis of rotation which taper outwardly from the head toward the ring.

Novel features and advantages of the present invention will become apparent to one skilled in the art from a reading of the following description in conjunction with the accompanying drawings wherein similar reference characters refer to similar parts and in which:

FIG. 1 is a view in elevation of one embodiment of this invention;
FIG. 2 is a top plan view of the implement shown in FIG. 1;
FIG. 3 is a cross-sectional view taken through FIG. 2 along the line 3—3;
FIG. 4 is a bottom plan view of the implement shown in FIG. 1;
FIG. 5 is a cross-sectional view taken through FIG. 3 along the line 5—5; and
FIG. 6 is a cross-sectional view taken through FIG. 5 along the line 6—6.

In FIGS. 1–6 is shown a rotatable mashing and whipping implement 10 which is attached to a powered source of rotation (not shown) by a stem 12 having coupling means 14. Such a source of rotation is for example a multi-use portable appliance of the type described in application for U.S. Letters Patent S.N. 181,383, filed March 21, 1962. A head 16 is attached to the portion of the stem remote from coupling means 14, and longitudinal blades 18 spaced about the longitudinal axis 20 of implement 10 extend away from the side of head 16 opposite to which stem 12 is attached. Blades 18 are disposed in substantial alignment with an imaginary surface of revolution having axis 20, and this surface of revolution is for example conical to taper blades 18 outwardly away from the direction of stem 12.

A ring 22 having a diameter or outer periphery extending outside that of blades 18 is attached to the ends of blades 18 remote from head 16, and it is disposed substantially perpendicular to axis 20. The outer corner or edge of ring 22 is rounded for reasons later explained. A series of bars 26 extend across blades 18 for stiffening them and preventing fingers from being caught and trapped between them. All of the corner surfaces of the implements with the exception of the cutting edges of the blades are somewhat rounded.

FIGS. 4 and 5 show how the leading edges 28 of the blades in one direction of rotation converge to a sharp edge, and peripheral grooves 30 shown in FIG. 1 scallop these sharp leading edges to increase their effective length. FIGS. 4 and 5 also show how leading edges 28 of blades 18 are radially farther away from axis of rotation 20 of implement 10 than the inner portions 32 of the trailing edges of blades 18. This provides a positive angle of attack for blades 18 thereby causing any particles struck by blades 18 to be maintained within their path of rotation for facilitating their complete mashing and cutting up and whipping.

FIGS. 2, 4 and 5 also show how the outer peripheries 34 of blades 18 are substantially aligned with an imaginary surface of revolution and inner surfaces 36 of blades 18 are substantially tangentially aligned to facilitate their molding fabrication with leading and trailing edges at the aforementioned angle of attack. Trailing edges 38 are substantially blunt. Upper portions 40 of ring 22 intermediate blades 18 are slightly raised to facilitate molding. The taper of inner surface 42 of ring 22 also facilitates molding and the feeding of substances within ring 42. This taper cooperates with that of inner surfaces 36 of blades 18 to facilitate the initial holding and breaking of larger particles as later described.

An implement 10 for rotating approximately at speeds ranging from 2,000 to 2,200 r.p.m. is for example made of a strong shockproof plastic such as nylon, and it is approximately two inches wide overall tapering to approximately one and one-quarter inches at the head with an overall height of approximately two inches.

Operation

Implement 10 is conveniently used to break up and mash and whip potatoes by being held in a portable source of rotation in a manner described in the following. Soft foods such as boiled potatoes are placed in the bottom of a mixing bowl, and implement 10 is brought into contact with them by pressing ring end 22 over the potatoes. Ring 22 confines the pieces of potato, and it breaks them up with larger pieces feeding up through the ring. When the potatoes are substantially broken up, blades 18 strike them with sharp leading edges 28 cutting finely up any remaining pieces. The positive angle of attack, provided by having leading edges 28 of inner surfaces 36 of the blades radially farther away from the axis of rotation than the trailing portions 32 of the inner surfaces, prevents particles struck by blades 18 from bouncing away from them. This maintains these particles in position for subsequent chopping and whipping by blades 18 without chasing them around the bowl. Any food particles struck by implement 10 are therefore held substantially within its path of motion thereby facilitating their complete chopping, mashing and whipping. A boiled potato can then accordingly be completely broken up in approximately ten seconds; and after milk, salt and pepper is added, the mixture can be completely whipped and fully aerated in about only forty-five seconds more. This permits a potato to be completely mashed and whipped in only one minute. The increase in the effective area of sharp leading edges 28 of blades 18 provided by peripheral grooves 30 facilitates their cutting and whipping functions within a compact size. Bars 26 between the blades are rounded to prevent injury to the fingers if they should be struck thereby. The rounded corners 24 of ring 22 permit implement 10 to be rocked on the bottom of a mixing bowl such as a flat pot thereby increasing their efficiency and ease of operation. This rocking action is particularly effective on flat bottomed pans. Potatoes can therefore be mashed and whipped within the same pot in which they are boiled. The wide periphery of ring 22 prevents blades 18 from striking the sides of the mixing bowl, and the inward taper of the upper portions of blades 18 minimizes splattering when the implement is withdrawn from a whipped mixture.

Other foods such as boiled apples can also be efficiently mashed and whipped into applesauce; and drinks can also be effectively mixed and whipped, particularly ice cream and milk mixtures into milk shakes. Implement 10 is therefore a uniquely effective multi-purpose mashing, whipping and general mixing implement for a wide variety of foods including soft foods such as mashed potatoes, and applesauce as well as a mixer and whipper for liquids including those incorporating a mixture of solids and liquids such as milk shakes.

What is claimed is:

1. A rotatable mashing and whipping implement comprising a head, a stem attached to the axis of said head, coupling means on the free end of said stem for connecting said implement to a source of rotation, longitudinal blades extending from said head away from said stem in substantial alignment with an imaginary surface of revolution having the same axis as said stem, a ring having an outer periphery extending outside of that of said blades disposed substantially perpendicular to the axis of said stem and connecting the ends of said blades remote from said head, leading edges of said blades in one direction of rotation converging to a relatively sharp edge, and said leading edges being disposed radially further from said axis of rotation than the inner portions of the trailing edges of said blades in said one direction of rotation.

2. An implement as set forth in claim 1 wherein said imaginary surface of revolution is conical, and the portions of said blades adjacent said head being closer together than those remote from said head for minimizing spatter when said implement is removed while it is rotating from insertion within a substance.

3. An implement as set forth in claim 1 wherein the peripheral surfaces of said blades are aligned with said surface of revolution, and the inner surfaces of said blades being tangentially disposed relative to said axis of rotation.

4. An implement as set forth in claim 1 wherein the outer surfaces of said blades are peripherally grooved and said leading edges being accordingly scalloped.

5. An implement as set forth in claim 1 wherein bars extend between said blades and connect them for stiffening said implement and preventing fingers from being caught between said blades.

6. An implement as set forth in claim 1 wherein the bottom corner edge of said ring is rounded.

7. An implement as set forth in claim 1 wherein a pair of said blades are provided.

8. A rotatable mashing and whipping implement comprising a head, a stem attached to said head at its longitudinal axis of rotation, a coupling means on the end of said stem remote from said head, a pair of substantially longitudinal blades extending from the side of said head opposite from said stem, said blades being disposed on opposite sides of said axis of rotation in a substantially axially balanced relationship, leading edges of said blades in one direction of rotation converging to a relatively sharp edge and trailing edge being relatively blunt, a ring having an outer periphery disposed outside of any portions of said blades being attached to the ends of said blades remote from said head, bars attached to and extending between said blades substantially perpendicular to said axis of rotation for stiffening said implement and preventing fingers from being caught between said blades, and the leading edges of said blades being disposed radially further from said axis of rotation than inner portions of the trailing edges of said blades.

9. An implement as set forth in claim 8 wherein the outer surfaces of said blades are peripherally grooved for scalloping the leading edges of said blades thereby increasing their effective length, and the outer bottom corner edge of said ring being rounded to facilitate rocking of said implement upon the bottom of a mixing container.

10. An implement as set forth in claim 8 wherein the distance between said blades increases as they extend away from said head.

References Cited in the file of this patent

UNITED STATES PATENTS

| | | |
|---|---|---|
| 332,680 | Swaim | Dec. 15, 1885 |
| 2,461,720 | Cawood et al. | Feb. 15, 1949 |